US009726148B2

(12) United States Patent
Melius et al.

(10) Patent No.: US 9,726,148 B2
(45) Date of Patent: Aug. 8, 2017

(54) SYSTEM AND METHOD FOR IMPROVING SPEED CONTROL OF A PITCH DRIVE SYSTEM OF A WIND TURBINE

(71) Applicant: General Electric Company, Schenectady, NY (US)

(72) Inventors: Jeffrey Alan Melius, Roanoke, VA (US); Mark Edward Cardinal, Altamont, NY (US); Joseph Lawrence Chacon, Greenville, SC (US)

(73) Assignee: General Electric Company, Schenectady, NY (US)

( * ) Notice: Subject to any disclaimer, the term of this patent is extended or adjusted under 35 U.S.C. 154(b) by 640 days.

(21) Appl. No.: 14/203,751

(22) Filed: Mar. 11, 2014

(65) Prior Publication Data

US 2015/0260160 A1    Sep. 17, 2015

(51) Int. Cl.
*F03D 7/04*   (2006.01)
*F03D 7/02*   (2006.01)
(Continued)

(52) U.S. Cl.
CPC ........... *F03D 7/042* (2013.01); *F03D 7/0224* (2013.01); *H02P 7/06* (2013.01); *H02P 7/298* (2013.01);
(Continued)

(58) Field of Classification Search
CPC ..... F03D 7/0224; F03D 7/042; Y02E 10/723; H02P 7/06; H02P 7/298; F05B 2260/76
(Continued)

(56) References Cited

U.S. PATENT DOCUMENTS 2,961,052 A * 11/1960 Smith ..................... B64C 27/32
                                                                416/26
3,876,920 A *  4/1975 Meissen ................. B60L 7/003
                                                               318/370
(Continued)

FOREIGN PATENT DOCUMENTS

| DE | 102004005169 B3 | 11/2005 |
| EP | 0 582 416 A1 | 2/1994 |
| EP | 2703642 A2 | 3/2014 |

OTHER PUBLICATIONS

Chiasson, "NonLinear Differential-Geometric Techniques for Control of a Series DC Motor", Proceedings of the American Control Conference, San Francisco, vol. No. 1, Issue No. 3, pp. 691-695, Jun. 2, 1993.

(Continued)

*Primary Examiner* — William McCalister
(74) *Attorney, Agent, or Firm* — Dority & Manning, P.A.

(57) ABSTRACT

The present subject matter is directed to a system and method for improving speed control of a pitch drive system of a wind turbine. In one embodiment, the pitch drive system includes a direct current (DC) motor having an armature and a series-field winding, a battery assembly having a positive terminal and a negative terminal, and a current-controlling device configured in series between the positive terminal of the battery assembly and the series-field winding. The battery assembly is configured to supply power to the pitch drive system and the current-controlling device is configured to supply current to the series-field winding so as to ensure a field flux does not equal zero. Thus, the current-controlling device has the effect of limiting the maximum speed of the DC motor.

7 Claims, 5 Drawing Sheets

(51) Int. Cl.
*H02P 7/298* (2016.01)
*H02P 7/06* (2006.01)

(52) U.S. Cl.
CPC ......... *F05B 2260/76* (2013.01); *Y02E 10/723* (2013.01)

(58) Field of Classification Search
USPC .................... 416/26, 27, 28, 29, 30; 322/59
See application file for complete search history.

(56) References Cited

U.S. PATENT DOCUMENTS

| | | | | |
|---|---|---|---|---|
| 4,186,333 | A * | 1/1980 | Kremer | B60L 7/006 318/269 |
| 5,875,281 | A | 2/1999 | Thexton et al. | |
| 7,126,236 | B2 | 10/2006 | Harbourt et al. | |
| 8,044,528 | B2 | 10/2011 | Roesmann | |
| 8,154,141 | B2 | 4/2012 | Andresen | |
| 2006/0208493 | A1* | 9/2006 | Harbourt | F03D 7/0224 290/44 |
| 2007/0057516 | A1 | 3/2007 | Mever et al. | |
| 2010/0135791 | A1* | 6/2010 | Melius | F03D 7/0224 416/1 |
| 2014/0054892 | A1* | 2/2014 | Brown | F03D 7/0224 290/44 |

OTHER PUBLICATIONS

European Search Report and Opinion issued in connection with corresponding EP Application No. 15157743.4 on Jul. 31, 2015.

\* cited by examiner

SYSTEM AND METHOD FOR IMPROVING SPEED CONTROL OF A PITCH DRIVE SYSTEM OF A WIND TURBINE

FIELD OF THE INVENTION

The present invention relates generally to wind turbines, and more particularly, to systems and methods for improving speed control of a pitch drive system of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, the wind turbine may include one or more pitch drive systems configured to pitch the rotor blades into the wind. As such, the rotor blades transmit the kinetic energy in the form of rotational energy so as to turn a shaft coupling the rotor blades to a gearbox, or if a gearbox is not used, directly to the generator. The gearbox steps up the inherently low rotational speed of the rotor for the generator to efficiently convert the rotational mechanical energy to electrical energy, which is fed into a utility grid via at least one electrical connection. A power converter is typically used to convert a frequency of a generated electric power to a frequency substantially similar to a utility grid frequency. Conventional wind turbines also typically include a main controller to control various operational modes of the wind turbine.

The pitch drive system typically includes a motor that rotates the blades to a desired pitch angle to adjust an amount of wind energy captured by the blades. Known pitch drive systems use a direct current (DC) motor having one of the following possible electrical connections between a stator and a rotor of the DC motor: series, shunt, or compound. A series-wound DC motor includes an armature and field windings connected in series with a common DC power source. In addition, series-wound DC motors are characterized by having very high starting torque, but generally poor speed regulation. In contrast, a shunt DC motor includes an armature and field windings connected in parallel with a common DC power source. As such, shunt-wound DC motors are generally characterized by having very good speed regulation, but do not have the starting torque of series-wound DC motors. The compound DC motor includes an armature and field windings having both shunt-wound and series-wound characteristics, thereby having benefits of both a shunt-wound and a series-wound DC motor. Compound DC motors, however, are typically more complex and expensive than series-wound or shunt-wound DC motors.

Accordingly, a pitch drive system having a DC motor that addresses the aforementioned problems would be welcomed in the technology. For example, a series-wound DC motor that incorporates a current-controlling device between a battery assembly and a series-field winding would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a pitch drive system for a wind turbine. In one embodiment, the pitch drive system includes a direct current (DC) motor having an armature and a series-field winding, a battery assembly having a positive terminal and a negative terminal, and a current-controlling device configured in series between the positive terminal of the battery assembly and the series-field winding. The battery assembly is configured to supply power to the pitch drive system. Further, the current-controlling device is configured to control current supplied to the series-field winding so as to ensure a field flux does not equal zero thereby improving speed control of the pitch drive system.

In another embodiment, the current-controlling device may include a resistor configured such that a current path bypasses the armature. This has the effect of limiting the maximum speed of the DC motor and flattening out the speed versus torque curve, which will be discussed in more detail herein. In another embodiment, the current-controlling device includes a plurality of diodes configured in series between the positive terminal and the series-field winding, the plurality of diodes configured such that a current path bypasses the armature. In a further embodiment, the pitch drive system may also include at least one additional diode configured between the positive terminal of the battery assembly and the current-controlling device. The additional diode has the effect of preventing power regeneration back into the battery assembly.

In still another embodiment, the pitch drive system may include at least one battery assembly operation contactor configured between the battery assembly and the resistor. In yet another embodiment, the pitch drive system may be electrically coupled to a pitch converter of the wind turbine. In such an embodiment, the pitch drive system may also include at least one pitch converter operation contactor configured between the resistor and the pitch converter.

In yet another embodiment, the battery assembly may include a plurality of batteries, wherein the current-controlling device is configured between the plurality of batteries.

In another aspect, the present subject matter is directed to a pitch drive system for a wind turbine. The pitch drive system includes a DC motor having an armature and a series-field winding, a battery assembly having a positive terminal and a negative terminal, and a plurality of diodes configured in series between the positive terminal and the series-field winding. Further, the battery assembly may be configured to supply power to the pitch drive system. Moreover, the plurality of diodes may be configured to control current supplied to the series-field winding so as to ensure a field flux does not equal zero thereby improving speed control of the pitch drive system.

In one embodiment, the pitch drive system may further include an additional diode configured between the positive terminal of the battery assembly and the plurality of diodes. As such, in one embodiment, the additional diode is configured to prevent power regeneration back into the battery. It should also be understood that the pitch drive system may include any of the additional features as described herein pertaining to other embodiments.

In yet another aspect, the present subject matter is directed to a method for improving speed control of a pitch drive system of a wind turbine. The method includes coupling a battery assembly having a positive terminal and negative terminal to the pitch drive system. The pitch drive system may also include a DC motor having an armature and a series-field winding. As such, the method may also include a step of controlling a current to the series-field winding so as to ensure a field flux of the series-field winding does not equal zero thereby improving speed control of the pitch drive system.

In one embodiment, the method may further include coupling the DC motor to a pitch converter of the wind turbine. In another embodiment, the step of controlling the current to the series-field winding may further include coupling at least one resistor in series between the positive terminal of the battery assembly and the series-field winding, wherein the resistor is configured to reduce a maximum speed of the DC motor. In a further embodiment, the method may further include coupling at least one diode between the positive terminal of the battery assembly and the resistor. In an alternative embodiment, the step of controlling the current to the series-field winding may further include coupling a plurality of diodes in series between the positive terminal of the battery assembly and the series-field winding, wherein the plurality of diodes are configured to reduce a maximum speed of the DC motor.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for improving speed regulation of a pitch drive system of a wind turbine. In one embodiment, for example, the pitch drive system includes a direct current (DC) motor having an armature and a series-field winding, a battery assembly having a positive terminal and a negative terminal, and a current-controlling device configured in series between the positive terminal of the battery assembly and the series-field winding. In one embodiment, the current-controlling device may include a resistor. In an alternative embodiment, the current-controlling device may include a plurality of diodes configured in series. In additional embodiments, the system may include an additional diode configured between the positive terminal of the battery assembly and the current-controlling device. As such, the additional diode(s) is configured to prevent power regeneration back into the battery assembly. In another embodiment, the battery assembly is configured to supply power to the pitch drive system. Moreover, the current-controlling device is configured to supply current to the series-field winding so as to ensure a field flux or flow of the series-field winding does not reach zero, thereby improving speed control of the pitch drive system. For example, the present disclosure as described herein is configured to limit the maximum speed and flatten the speed versus torque curve of the DC motor. In addition, the series-field DC motor as described herein is configured to generate power and deliver it to the current-controlling device as well as the battery assembly. The present disclosure may also supply sufficient field flux to initiate regeneration.

The present disclosure has numerous advantages not present in the prior art. For example, typical series-field DC motors have very poor speed regulation for certain torque levels, e.g. at low positive and negative torque levels, and can reach self-destructive high speeds. In response, tower loads of the wind turbine may increase to an unacceptable level. The pitch drive system of the present disclosure, however, provides improved speed regulation by preventing the field flux of the series-field winding from going to zero. In addition, the present subject matter offers a simple and economical alternative to compound DC motors.

Figure 1:
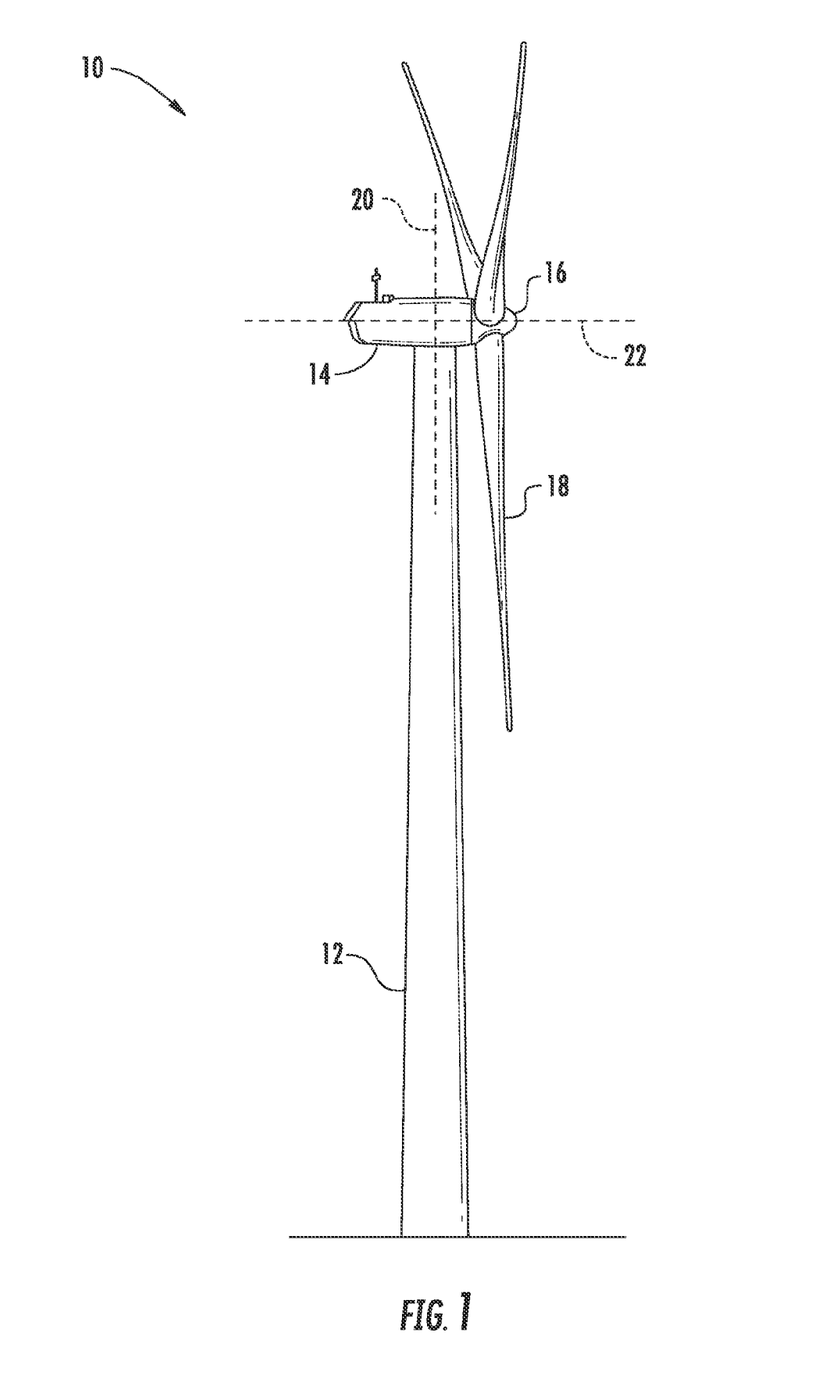
FIG. 1 illustrates a perspective view of one embodiment of a wind turbine according to the present disclosure.

Referring now to the drawings, FIG. 1 illustrates one embodiment of a exemplary wind turbine 10. In the illustrated embodiment, the wind turbine 10 includes a tower 12, a nacelle 14 that is coupled to tower 12, a hub 16 that is coupled to nacelle 14, and one or more rotor blades 18 coupled to the hub 16. The tower 12 provides support for the nacelle 14, the hub 16, and the blade(s) 18. The nacelle 14 is coupled to tower 12 and houses components (not shown) for use in transforming rotational energy of blade 18 into electricity, e.g. a generator. The hub 16 is coupled to nacelle 14 and provides a rotatable housing for at least one blade 18. The one or more rotor blades 18 are coupled to the hub 16. For example, as shown in the illustrated embodiment, three rotor blades 18 are coupled to the hub 16 and are rotatable about an axis of rotation 22 when wind strikes the blades 18. In addition, each rotor blade 18 rotates through substantially the same plane of rotation and substantially parallel to a centerline axis 20 of the tower 12.

Figure 2:
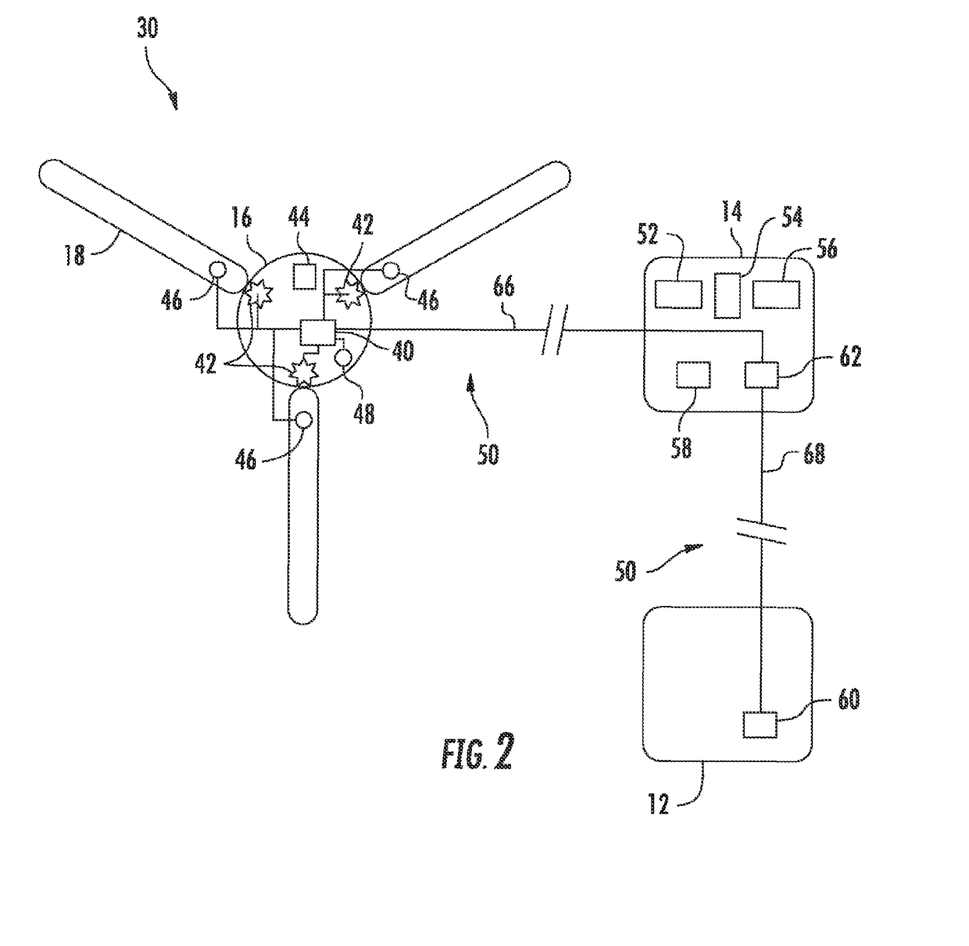
FIG. 2 illustrates a block diagram of one embodiment of a wind turbine control system that may be used with the wind turbine shown in FIG. 1.

Referring now to FIG. 2, a block diagram of one embodiment of a wind turbine control system 30 that may be used with the wind turbine 10 of FIG. 1 is illustrated. For example, the control system 30 may be coupled to any of the components within the hub 16, the rotor blades 18, the nacelle 14, and the tower 12. Further, in an additional embodiment, a pitch controller 40, at least one pitch drive 42, a hub backup power supply 44, and a hub sensor 48 may be positioned on or within hub 16 for controlling the pitch of the one or more rotor blades 18. As shown, the pitch controller 40 may be located within the hub 16 and coupled to the rotor blades 18 through the pitch drives 42. Further, the pitch controller 40 may be configured to control, for example, a pitch angle and/or a relative position of the rotor blades 18. Moreover, the pitch controller 40 may utilize a communication network 50 to communicate with a wind turbine controller 60.

In one embodiment, the pitch controller 40 may include a programmable logic controller (PLC). In an alternative embodiment, the pitch controller 40 may include a microprocessor, a microcontroller, a field programmable gate array (FPGA) or any other programmable circuit that enables the pitch controller 40 to operate as described herein. As used herein, the term "control" includes, but is not limited to including, issuing commands to be implemented by exercising oversight and supervision of, and/or directing operation of, one or more subject components of the wind turbine 10. In addition, the term "control" may also include a regulation-type of control, e.g., a feedback-loop regulation.

Still referring to FIG. 2, the pitch drives 42 may receive one or more pitch commands from the pitch controller 40, and in response, rotate the rotor blades 18 to a desired position and/or pitch angle identified by the pitch commands. Further, the pitch drives 42 may rotate the rotor blades 18 using, for example, hydraulic, electric, and/or gear-driven means. In one embodiment, the hub sensor 48 may determine a speed of rotation of and/or a load induced to the hub 16. The hub backup power supply 44 may include, for example, a battery, a magnetic energy storage device, and/or one or more capacitors. As such, the hub backup power supply 44 may provide electrical power to the components within the hub 16, e.g. the pitch controller 40, the pitch drives 42, and the hub sensor 48.

In addition, a blade sensor 46 may be coupled to each rotor blade 18, as shown in FIG. 2. The blade sensor(s) 46 may also be coupled to the pitch controller 40. Further, the blade sensors 46 are configured to determine a plurality of blade conditions, including, but not limited to a rotational speed of each rotor blade 18 and/or a load acting on the rotor blades 18, and/or a pitch angle of one or more of the rotor blades 18.

In a further embodiment, the nacelle 14 may also include a gearbox 52, a brake 54, a generator 56, a battery 58, and a nacelle controller 62. The gearbox 52 is configured to augment the rotation of a main rotor shaft (not shown) driven by the rotation of the rotor blades 18, thereby inducing a higher amount of rotational energy to the generator 56. In an alternative embodiment, the nacelle 14 may not include a gearbox 52. The brake 54 may provide emergency stopping power to the generator 56 and/or to wind turbine operation in an event of a fault or other error condition. The generator 56 is configured to transform the rotational energy of the main rotor shaft into electrical energy. Further, the generator 56 may be of any suitable type that enables wind turbine 10 to function as described herein. For example, and without limitation, in one embodiment, the generator 56 is a wound rotor induction generator, such as a doubly fed induction generator. Further, the battery 58 is configured to provide backup electrical power to the components within the nacelle 14 and/or the tower 12.

The nacelle controller 62 controls operation of the components within the nacelle 14, such as the gearbox 52, the brake 54, the generator 56, and/or the battery 58. In a further embodiment, the nacelle controller 62 is coupled to the pitch controller 40 and to the wind turbine controller 60 via the communication network 50. More specifically, in one embodiment, the nacelle controller 62 is coupled to the pitch controller 40 via a nacelle-hub network 66, and to the wind turbine controller 60 via a nacelle-tower network 68.

The wind turbine controller 60 may also be located within the tower 12. In an alternative embodiment, the wind turbine controller 60 may be located within the nacelle 14. In still further embodiments, the wind turbine controller 60 may operate as a master controller of the wind turbine 10 and/or of the control system 30, and may include a computer or other processor that is programmed to execute control algorithms. As used herein, the term "processor" includes, without limitation, any programmable system including systems and microcontrollers, reduced instruction set circuits (RISC), application specific integrated circuits (ASIC), programmable logic circuits (PLC), and any other circuit capable of executing the functions described herein. Further, the wind turbine controller 60 may control other controllers of the wind turbine 10, e.g. the pitch controller 40, communicate with other wind turbines (not shown) and/or a wind farm management system (not shown), and/or perform error handling and operational optimization. Moreover, in one embodiment, the wind turbine controller 60 may also execute a SCADA (Supervisory, Control and Data Acquisition) program.

The hub 16 may be communicatively coupled to the nacelle 14 and to the tower 12 via the communication network 50. The communication network 50 may include the nacelle-hub network 66 and the nacelle-tower network 68. More specifically, in one embodiment, the hub 16 may be coupled to the nacelle 14 via the nacelle-hub network 66, and the nacelle 14 may be coupled to the tower 12 via the nacelle-tower network 68. Moreover, the pitch controller 40 may be coupled to the wind turbine controller 60 via the nacelle-hub network 66 and via the nacelle-tower network 68. In a further embodiment, the nacelle-hub network 66 may utilize a slip ring connection to transmit signals via a serial communication protocol or another suitable communication protocol, such as broadband over power line (BPL) protocol. In an alternative embodiment, the nacelle-hub network 66 may include any other connection that enables the network 66 to operate as described herein. In another embodiment, the nacelle-tower network 68 may include one or more of such connections as Ethernet Local Area Network (LAN), wireless LAN, a Controller Area Network (CAN) bus, fiber optic connection, or any other communication connection that enables the nacelle-tower network 68 to operate as described herein.

Figure 3:
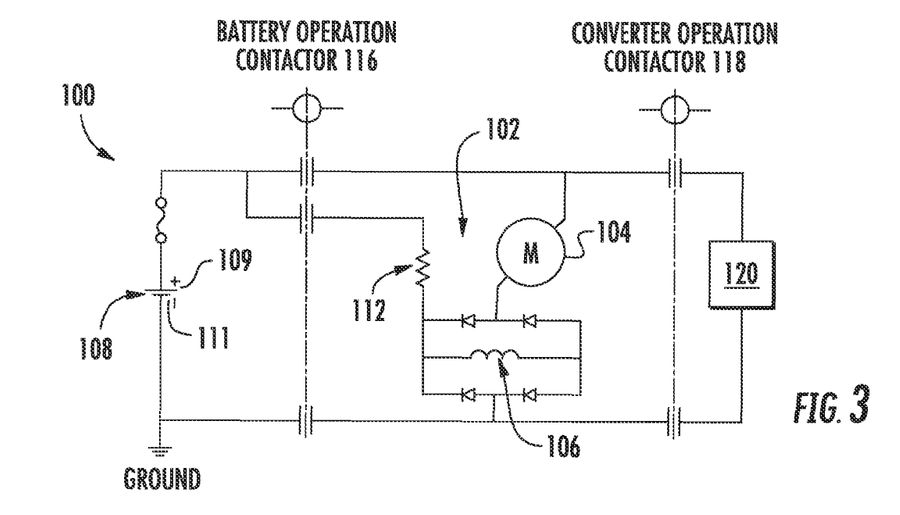
FIG. 3 illustrates a schematic diagram of one embodiment of a pitch drive system according to the present disclosure.
Figure 4:
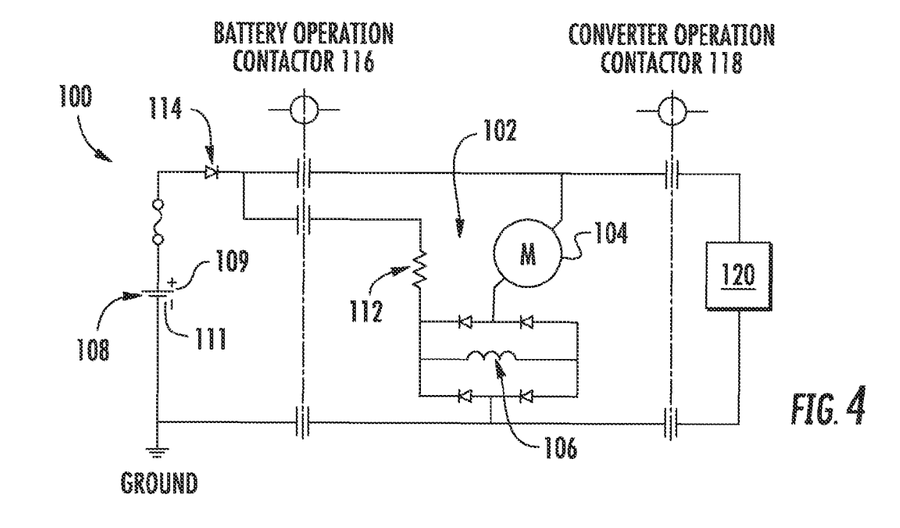
FIG. 4 illustrates a schematic diagram of another embodiment of a pitch drive system according to the present disclosure.
Figure 5:
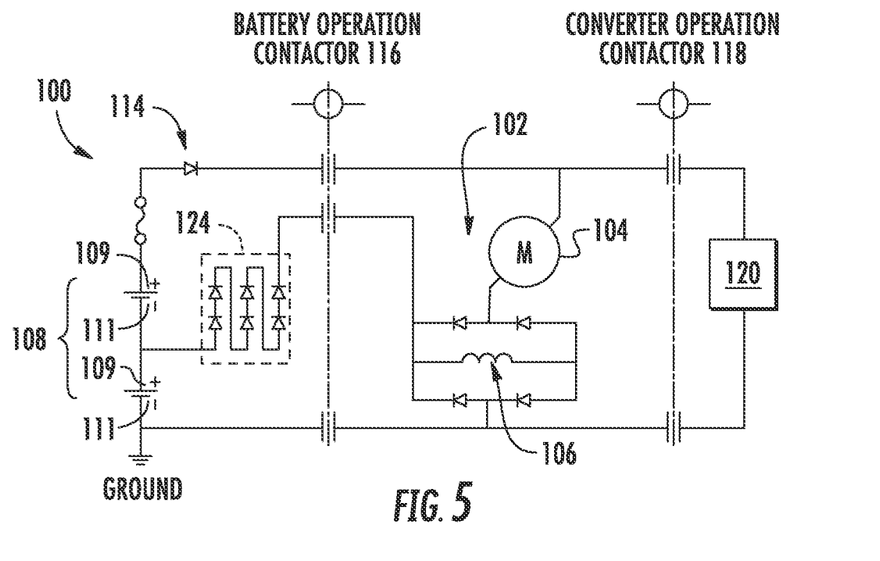
FIG. 5 illustrates a schematic diagram of yet another embodiment of a pitch drive system according to the present disclosure.

Referring now to FIGS. 3-5, various embodiments of a pitch drive system 100 that may be used with, or in place of, the pitch drive 42 (shown in FIG. 2) to pitch the one or more rotor blades 18 of the wind turbine 10 (both shown in FIG. 1) are illustrated. As shown, the pitch drive system 100 may include a direct current (DC) motor 102 that includes an armature 104 and a winding 106. Further, the pitch drive system 100 may include a battery assembly 108 that is configured to provide power to the DC motor. As shown, the winding 106 includes a series-field winding due to the armature 104 and field windings 106 being connected in series and having a common DC power source, e.g. the battery assembly 108. Further, the battery assembly 108 typically includes a positive terminal 109 and a negative terminal 111. In addition, in various embodiments, the battery assembly 108 may include one or more batteries, capacitors, and/or any suitable energy storage devices that enable the pitch drive system 100 to operate as described herein.

Figure 6:
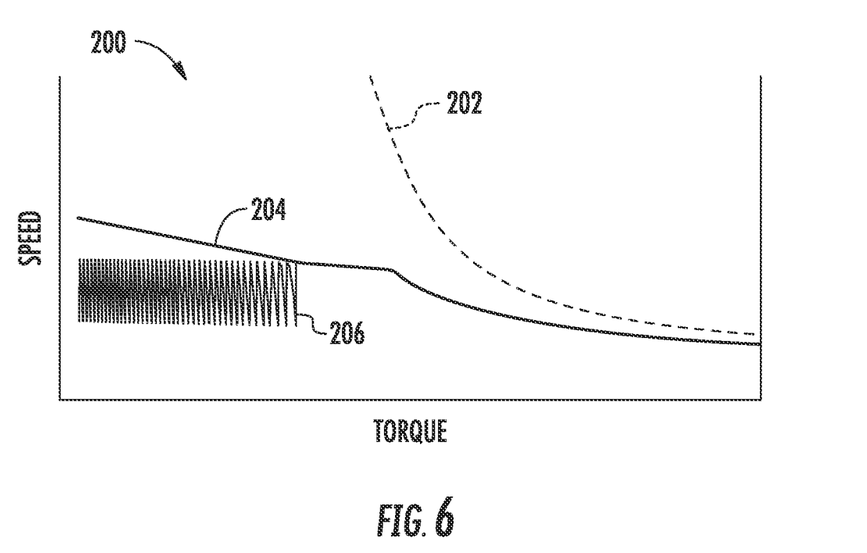
FIG. 6 illustrates a graph of torque (x-axis) versus speed (y-axis) for various embodiments of the present disclosure; and, FIG. 7 illustrates a method for improving speed control of a pitch drive system according to the present disclosure.

Referring particularly to FIG. 3, the pitch drive system 100 may also include at least one current-controlling device, i.e. resistor 112, configured in series between the positive terminal 109 of the battery assembly 108 and the series-field winding 106. In various embodiments, the resistor 112 is configured to supply current to the series-field winding 106 so as to ensure a field flux of the series field winding 106 does not reach zero thereby improving speed control of the pitch drive system 100. In addition, as shown in the illustrated embodiment, the resistor 112 is configured such that a current path bypasses the armature 104. Advantages provided by adding at least one resistor 112 to the pitch drive system 100 as described herein can be better understood with reference to FIG. 6. As shown, line 202 represents conventional systems (without a resistor or diode), whereas lines 204 and 206 represent the embodiments of FIGS. 4 and 3, respectively. More specifically, FIG. 6 illustrates a graph of torque (x-axis) versus speed (y-axis) of the DC motor. As shown, for conventional systems (line 202), the speed of the DC motor at low torque increases exponentially, thereby potentially reaching self-destructive values. In contrast, as shown, the addition of at least one resistor 112 (FIG. 3) limits the speed of the system as represented by line 206. Similarly, the addition of the combination of at least one resistor 112 and at least one diode also provides improved speed regulation of the DC motor.

Thus, the various embodiments of the present disclosure as described herein are configured to limit the maximum speed and therefore flatten the speed versus torque curve of the DC motor. Further, the resistor(s) 112 supplies sufficient field flux to the motor 102 to initiate regeneration. As such, the series-field DC motor 102 as described herein can generate power and deliver it to the added resistor(s) as well as the battery assembly 108. In one embodiment, where the motor 102 begins delivering power back to the battery assembly 108, a positive feedback effect can occur since adding more current to the field increases the armature voltage, which increases the armature current and the field current. Such positive feedback tends to cause the motor 102 to oscillate between motoring and generating, as shown by line 206 of FIG. 6. Thus, the illustrated embodiment of FIG. 4 depicts the pitch drive system 100 of FIG. 3 with the addition of at least one diode 114 configured between the positive terminal 109 of the battery assembly 108 and the resistor 112. The diode 114 has the effect of preventing power regeneration back into the battery assembly 108. In addition, the diode(s) 114 act to force additional field current through the field windings 106, thereby increasing the torque due to an increase in generator speed.

As mentioned, possible advantages of adding the resistor(s) 112 in combination with the diode(s) 114 to the pitch drive system 100 are also illustrated in FIG. 6. For example, as shown, line 204 illustrates the torque versus speed of the embodiment of FIG. 4, which, similar to line 206, limits the speed of the system as represented by line 204. In contrast to line 206, however, the effect of adding the diode(s) 114 reduces oscillation of the motor 102 between motoring and generating, effectively reducing the positive feedback effect.

Referring particularly to FIG. 5, another embodiment of the pitch drive system 100 of the present disclosure is illustrated. As shown, the pitch drive system 100 includes a current-controlling device, i.e. a plurality of diodes 124, connected in series and configured between the positive terminal 109 of one of the batteries of the battery assembly 108 and the series-field winding 106 (similar to the resistor(s) 112 of FIG. 3). For example, the illustrated embodiment includes six diodes connected in series. In additional embodiments, the pitch drive system 100 may include more or less than six diodes 124 connected in series. Similar to the resistor(s) 112 of FIGS. 3 and 4, the plurality of diodes 124 are configured to supply current to the series-field winding 106 to ensure the field flux of the winding 106 does not reach zero. In addition, as shown, the diodes 124 are configured such that the current path from the battery assembly 108 bypasses the armature 104. The embodiment of FIG. 5 also includes at least one diode 114 configured between the positive terminal 109 of one of the batteries of the battery assembly 108 and the armature 104.

Referring generally to FIGS. 3-5, the pitch drive system 100 may also include one or more battery operation contactors 116 that are configured to open or close so as to electrically decouple or couple, respectively, the battery assembly 108 and the DC motor 102. In addition, the pitch drive system 100 may also include one or more converter operation contactors 118 that are configured to open or close so as to electrically decouple or couple, respectively, the pitch converter 120 and the DC motor 102 as desired. In a further embodiment, the battery operation contactors 116 and/or converter operation contactors 118 may include one or more contactors, relays, or other suitable components that enable the pitch drive system 100 to operate as described herein. As such, in one embodiment, the pitch controller 40 (shown in FIG. 2) may be operatively coupled to the pitch drive system 100 and may control the converter operation contactors 118 and the battery operation contactors 116. For example, in one embodiment, the pitch controller 40 may close the converter operation contactors 118 and open the battery operation contactors 116 such that the battery assembly 108 provides power to the pitch drive system 100. In addition, the pitch controller 40 may also be configured to control a current through the series-field winding 106. Further, as mentioned, the DC motor 102 may generate excess, or regenerative, energy within the pitch drive system 100, such as during a motor braking operation. If excess energy is present in the pitch drive system 100, the pitch controller 40 may direct the excess energy to the series-field winding 106 such that winding 106 absorbs at least a portion of the excess energy.

Figure 7:
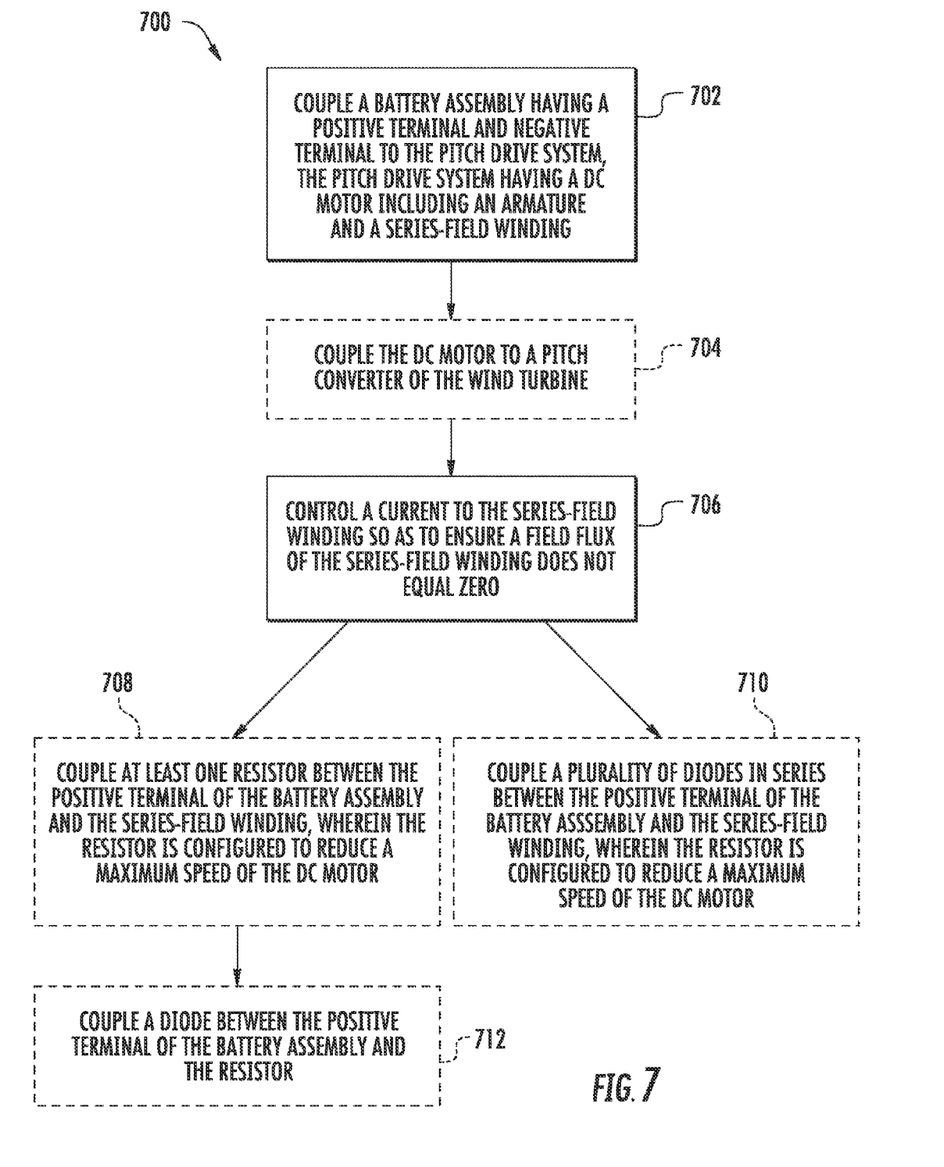

Referring now to FIG. 7, a method 700 for improving speed control of a pitch drive system of a wind turbine is illustrated. In one embodiment, the method 700 includes a step 702 of coupling a battery assembly having a positive terminal and negative terminal to the pitch drive system. Further, the pitch drive system typically has a DC motor including an armature and a series-field winding. The method 700 may also include an optional step 704 of coupling the DC motor to a pitch converter of the wind turbine. A next step 706 may include controlling a current to the series-field winding so as to ensure a field flux of the series-field winding does not equal zero thereby improving speed control of the pitch drive system. In various embodiments, the step 706 of controlling the current to the series-field winding may further include a step 708 of coupling at least one resistor between the positive terminal of the battery assembly and the series-field winding such that the resistor is configured to reduce a maximum speed of the DC motor. Such a method step 708 may also include an additional step 712 of coupling a diode between the positive terminal of the battery assembly and the resistor. In an alternative embodiment, the step 706 of controlling the current to the series-field winding may include coupling a plurality of diodes in series between the positive terminal of the battery assembly and the series-field winding (step 710). Thus, the plurality of diodes may be configured to reduce a maximum speed of the DC motor.

Exemplary embodiments of the pitch drive system and a method and apparatus for powering the pitch drive system are described above in detail. The method, apparatus, and system are not limited to the specific embodiments described herein, but rather, components of the apparatus and/or system and/or steps of the method may be utilized independently and separately from other components and/or steps described herein. For example, the embodiments may also be used in combination with other systems and methods, and are not limited to practice with only the pitch drive system as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch drive system for a wind turbine, the pitch drive system comprising:
    a direct current (DC) motor comprising an armature and a series-field winding;
    a battery assembly comprising a positive terminal and a negative terminal, wherein the battery assembly is configured to supply power to the pitch drive system; and,
    a resistor arranged in series between the positive terminal of the battery assembly and the series-field winding, the resistor arranged such that a current path bypasses the armature, wherein the resistor controls current supplied to the series-field winding so as to ensure a field flux does not equal zero, thereby improving speed control of the pitch drive system.

2. The pitch drive system of claim 1, further comprising at least one battery assembly operation contactor configured between the battery assembly and the resistor.

3. The pitch drive system of claim 1, wherein the pitch drive system is electrically coupled to a pitch converter of the wind turbine.

4. The pitch drive system of claim 3, further comprising at least one pitch converter operation contactor configured between the resistor and the pitch converter.

5. A method for improving speed control of a pitch drive system of a wind turbine, the method comprising:
    coupling a battery assembly having a positive terminal and negative terminal to the pitch drive system, the pitch drive system having a direct current (DC) motor including an armature and a series-field winding; and,
    controlling, via a resistor arranged in series between the positive terminal of the battery assembly and the series-field winding, a current to the series-field winding so as to ensure a field flux of the series-field winding does not equal zero, thereby improving speed control of the pitch drive system, the resistor arranged such that a current path bypasses the armature.

6. The method of claim 5, further comprising coupling the DC motor a pitch converter of the wind turbine.

7. The method of claim 5, wherein the resistor is configured to reduce a maximum speed of the DC motor.

* * * * *